June 11, 1935.  J. P. FOECKLER, SR  2,004,524
HOUSEHOLD TOOL
Filed June 30, 1934
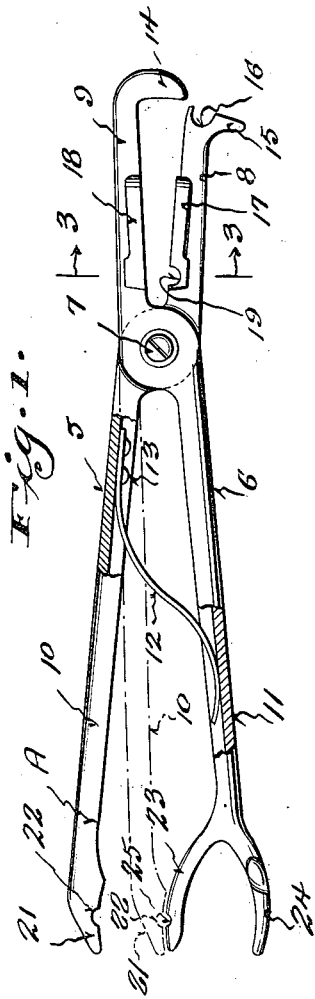
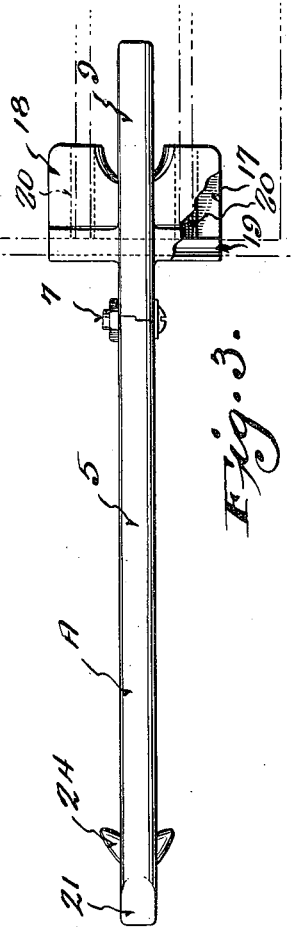
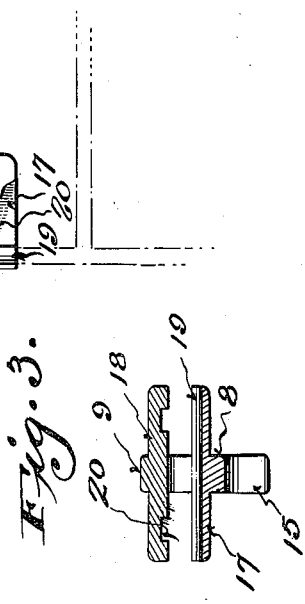
Inventor
John P. Foeckler, Sr.

Patented June 11, 1935

2,004,524

UNITED STATES PATENT OFFICE 2,004,524

HOUSEHOLD TOOL

John P. Foeckler, Sr., Milwaukee, Wis.

Application June 30, 1934, Serial No. 733,255

1 Claim. (Cl. 294—3)

This invention appertains to household tools, and more particularly to a novel appliance especially susceptible for use in kitchens.

One of the primary objects of my invention is to provide a combination kitchen utensil, so designed as to effectively handle hot pots and pans, utensil covers, stove lids, oven and broiler racks, etc., without danger of the user becoming burned by such hot pans, etc.

Another salient object of my invention is the provision of a kitchen utensil of the above character embodying a pair of cross handles, or levers, having jaw members formed thereon in a novel manner for gripping the side of a pot or pan, one of the jaw members having a groove therein for receiving the bead of the pot or pan, whereby danger of the pot or pan slipping is entirely eliminated.

A further important object of my invention is to provide auxiliary flat jaw members carried by the levers in rear of the main jaw members for cooperation therewith for lifting wire oven and broiler racks, the auxiliary jaws being so formed as to receive and hold certain of the wires from which the racks are formed.

A further object of my invention is to provide novel means for forming the handle ends of the levers, whereby utensil covers can be conveniently grasped and held, and whereby stove lids can be conveniently manipulated.

A still further object of my invention is to provide a combination kitchen utensil of the above character, which will be durable and efficient in use, one that will be simple and easy to manufacture, and one which can be placed upon the market at a reasonable cost.

With these and other objects in view, the invention consists in the novel construction, arrangement and formation of parts, as will be hereinafter more specifically described, claimed and illustrated in the accompanying drawing, in which drawing:—

Figure 1 is a side elevation of my improved kitchen utensil, parts of the same being shown broken away and in section to illustrate structural details.

Figure 2 is a top plan view of the improved tool, with the upper auxiliary jaw broken away.

Figure 3 is a transverse section through the tool taken on the line 3—3 of Figure 1, looking in the direction of the arrows.

Referring to the drawing in detail, wherein similar reference characters designate corresponding parts throughout the several views, the letter A generally indicates my improved kitchen utensil, which comprises a pair of crossed levers 5 and 6.

These levers are pivotally connected together by a transversely extending pivot pin 7, and the levers have formed respectively thereon the forwardly projecting elongated jaws 8 and 9. The rear ends of the levers 5 and 6 are considerably longer than the jaws 8 and 9 to provide manipulating handles 10 and 11. The outer faces of the handles 10 and 11 are preferably rounded so that an operator can conveniently grasp the same.

Means is provided for normally urging the handles 10 and 11 away from one another, and the jaws 8 and 9 to their open position. This means may consist of a leaf spring 12 riveted, or otherwise secured, at one end, as at 13, to one handle. The other end of the spring bears against the inner face of the other handle.

Particular stress is laid on the formation of the forwardly extending elongated jaws 8 and 9, and it is to be noted that the jaw 9 is provided with a depending, right-angularly extending gripping head, or jaw, 14. The jaw 8 has its forward end likewise provided with an angularly extending gripping head, or jaw, 15, and when the handles 10 and 11 are grasped and urged toward one another, the jaws 8 and 9 will be brought into contact, and the jaw 14 will ride over the jaw 15 into gripping contact therewith. The jaw 15 is provided with a transversely extending groove 16 which is adapted to receive the bead of the cooking utensil or pot.

When the utensil is utilized for lifting pots or pans, the tool is operated so that the jaw 14 will overlie the inner side of the pan, and the jaw 15 will engage the outer side of the pan, with the bead resting in the groove 16. When pressure is applied to the handles 10 and 11, the pot will be firmly grasped and the same can be conveniently lifted and otherwise handled. This eliminates any danger of the operator being burned and also eliminates the use of cloths for gripping utensils.

The jaw members 8 and 9 have formed respectively thereon relatively broad, flat auxiliary jaws 17 and 18. These jaws 17 and 18 extend transversely across the main jaws 8 and 9 and project materially beyond the opposite sides thereof. By referring to Figures 1 and 2, it is to be noted that the auxiliary jaws are located between the pivot pin 7 and the jaws 14 and 15.

The jaw 17 adjacent to its rear end is provided with a transversely extending groove 19, while the inner face of the jaw 18 is provided with a pair of longitudinally extending grooves 20. The jaws 17 and 18 cooperate with the jaws 14 and 15 for lifting wire oven and broiler racks, and the utensil is particularly adapted for this purpose.

As is well known, oven and broiler racks generally embody a marginal frame wire and longitudinally and transversely extending body wires. Thus, when a rack is to be manipulated, the tool is grasped in the hand and the jaws 8 and 9 are placed over and on opposite sides of the rack. The front marginal frame wire of the rack will rest in the groove 19, and certain of the longitudinal wires will rest in the grooves 20. One of the transverse wires of the rack can be received in the groove 16 of the jaw 15.

When pressure is applied to the handles 10 and 11, the rack will be firmly gripped, and slipping movement of the rack is precluded in view of the engagement of the wires in the various grooves. Obviously, the rack can now be pulled out of the oven and otherwise handled.

The tool is also formed to facilitate the handling of utensil covers, and the handle 10 can be provided with an angularly projecting foot 21 having its inner face provided with a transversely extending groove 22.

The forward end of the handle 11 is bifurcated to provide spaced arms 23 and 24. The arm 23 has is outer face provided with a groove 25, and the arm 24 is shaped to provide a stove lifter.

The arm 23 is adapted to cooperate with the foot 21 for manipulating untensil covers, and the foot can be readily slipped under and through the lifting rings of the covers, and by bringing the handles 10 and 11 toward one another, the lifting ring will be firmly gripped between the foot 21 and the arm 23, and the ring can rest in the mating grooves 22 and 25.

From the foregoing description it can be seen that I have provided an exceptionally durable and efficient kitchen utensil which will permit the free handling of pots, pans, covers, etc., without the danger of the operator being burned, and without the use of unsanitary pads, gloves, rags, etc.

Changes in details may be made without departing from the spirit or the scope of my invention, but what I claim as new is:—

A kitchen utensil comprising, a pair of pivotally connected crossed levers, a right-angularly extending jaw formed on the forward end of one lever, an angularly extending jaw formed on the forward end of the other lever, said last mentioned jaw being provided with a transversely extending groove, and auxiliary flat jaws formed on the levers intermediate the pivotal connection of the levers and the first mentioned jaws, said auxiliary jaws projecting laterally beyond the levers and having their inner faces provided with longitudinally and transversely extending grooves, all of the grooves of the jaws being adapted to receive the wires of wire oven and broiler racks.

JOHN P. FOECKLER, Sr.